United States Patent [19]

Kataoka

[11] Patent Number: 4,790,405
[45] Date of Patent: Dec. 13, 1988

[54] SEAT BELT SYSTEM
[75] Inventor: Sachiro Kataoka, Ebina, Japan
[73] Assignee: Nissan Motor Company, Limited, Yokohama, Japan
[21] Appl. No.: 102,060
[22] Filed: Sep. 28, 1987
[30] Foreign Application Priority Data Sep. 26, 1986 [JP]  Japan ................ 61-226189

[51] Int. Cl.⁴ .............................................. B60R 21/00
[52] U.S. Cl. .................... 180/268; 180/282; 280/804; 280/806; 280/808
[58] Field of Search ............... 180/268, 282; 280/804, 280/806, 808

[56] References Cited
U.S. PATENT DOCUMENTS
4,573,709 3/1986 Kawai et al. .................. 280/804

FOREIGN PATENT DOCUMENTS
55-8593  1/1980  Japan .
56-71643 6/1981  Japan .

Primary Examiner—Kenneth R. Rice
Attorney, Agent, or Firm—Pennie & Edmonds

[57] ABSTRACT

A seat belt system includes a prohibition means for preventing a sliding block connected to one end of a seat belt from moving when the vehicle is rapidly decelerated and confirmation means for confirming the connection between connectors provided in the prohibition means. The confirmation means a connector, 4-pin and a short circuit provided between two pins of the connector so as to be opposite to the detecting switch provided between the other pins of the connector.

14 Claims, 3 Drawing Sheets

SEAT BELT SYSTEM

BACKGROUND OF THE INVENTION

1. FIELD OF THE INVENTION

The present invention relates to a seat belt system, particularly to a passive seat belt system which automatically causes a seat belt to move between a fitted position, in which the occupant is restricted by means of the seat belt, and a release position, in which the occupant is not restricted by means of the seat belt, when the occupant is getting in and out of a vehicle.

2. DESCRIPTION OF THE PRIOR ART

The Japanese Patent First Publication Showa 56-71643 discloses a passive seat belt system. In this system, a guide rail is mounted on the roof side rail of a vehicle. A sliding block, which is slidable on the guide rail, is provided at one end of a seat belt. The sliding block is connected to one end of an actuation wire and the other end of the actuation wire is drivingly associated with a drive motor for driving the sliding block along the guide rail. Therefore, one end of the seat belt can move along the guide rail according to the movement of the sliding block which is driven by the drive motor via the actuation wire. In addition, a latch base is provided at one end of the guide rail on the side of the drive motor, i.e. at the rear end of the guide rail. When the sliding block is moved from the front end of the guide rail, i.e. the release position, to the position of the latch base, i.e. the fitted position, an engaging portion, which is provided at the tip of the sliding block, is latched by means of the latch base. The movement of the sliding block is completed at this position, so that the occupant is restricted by means of the seat belt.

The movement of the sliding block is controlled by a control circuit which includes a door switch and two limit switches. The door switch comprises two stationary terminals and a movable contact which is movable between the stationary terminals in accordance with opening and closing of the door. One of the stationary terminals, to which the movable contact contacts while the door is opened, will be hereafter referred to as "door open position detecting terminal". The other stationary terminal, to which the movable contact contacts while the door is closed, will be hereafter referred to as "door closed position detecting terminal".

One of the limit switches is oriented adjacent the front end of the guide rail for detecting the sliding block at the front end. This limit switch will be thus referred as "front end position detecting switch". The other limit switch is positioned adjacent the rear end of the guide rail for detecting the sliding block at the rear end. This limit switch is thus referred to as "rear end position detecting switch". In addition, the control circuit includes a sensor which becomes ON to restrict the movement of the sliding block when the vehicle is rapidly decelerated, such as upon collision of the vehicle.

In order to assure emergency safety operation of the seat belt, inspection has to be performed after installation of the seat belt system to the vehicle or after completion of assembling of the vehicle. A difficulty of inspection is encountered. Normally, unless emergency condition, such as collision, occurs to cause rapid deceleration of the vehicle, the sensor will be held OFF to maintain the seat belt system at initial position. On the other hand, when the connection between the sensor and the control circuit is broken, no trigger signal to actuate the seat belt system will be input to hold the seat belt system at the initial position. Therefore, inspection has to be performed under emergency condition in which the seat belt system becomes active when the sensor is connected. In practice, to turn the sensor ON, substantial deceleration has to be applied to the vehicle. This requires substantially high skill in checking emergency seat belt locking condition.

SUMMARY OF THE INVENTION

It is therefore a principal object of the present invention to eliminate the aforementioned disadvantage and to provide a seat belt system in which the connection state of a slider restricting means including a sensor can be easily checked.

In order to accomplish the aforementioned and other specific objects, a seat belt system, according to the present invention, employs an electric circuit establishing an emergency lock for a seat belt for restricting a vehicular seat occupant upon emergency condition of the vehicle. The electric circuit includes a sensor means for detecting rapid deceleration of the vehicle. The electric circuit becomes active to establish the emergency lock when the sensor means detects the rapid deceleration of the vehicle. The circuit further includes an indicator connected to the sensor means and a common circuit which is also connected to a switch which is switchable between ON and OFF. The indicator is so arranged as to turn ON in response to turning ON of said switch while said sensor means is correctly connected in said electric circuit.

According to one aspect of the present invention, the seat belt system comprises:

a seat belt for restricting the occupant;

drive means for causing the seat belt to move between a fitted position, in which the occupant is restricted by means of the seat belt, and a release position, in which the occupant is released from the seat belt;

control means for controlling the movement of the seat belt;

prohibition means for preventing the seat belt from moving from the fitted position to the release position for a predetermined time when the vehicle speed is rapidly decreased; and confirmation means for confirming the connection of the prohibition means.

The prohibition means may comprise a detecting switch which becomes ON to restrict the movement of the seat belt when the vehicle collides with an object or when the vehicle speed is rapidly decreased. The detecting switch is preferably a sensor. The seat belt may be provided with a sliding block, which is slidable on a guide rail extending longitudinally along the edge of the roof of the vehicle, at one end thereof. The drive means may cause the sliding block to move between the front and rear ends of the guide rail. The drive means preferably comprises a drive motor and an actuation wire which is provided within the guide rail so that one end of the actuation wire is fixed to the sliding block and the other end of the actuation wire is fixed to the drive motor. The sliding block is preferably latched by means of a latch base at the rear end of the guide rail in order to restrict the occupant. The confirmation means may comprise a 4-pin connector and a short circuit provided between two pins of the connector. In this case, the detecting switch is preferably provided between the other two pins of the connector so as to be opposite to the short circuit. The short circuit may be connected to a warning means and an active belt switch, which becomes OFF when the manually operated seat belt restricting the waist of the occupant is set and which becomes ON when the seat belt is removed, in series. The warning means may be warning lamp emitting light or a chime producing a warning noise. In addition, a timer circuit, which supplies power to the warning means for a predetermined time when the active belt switch becomes ON, may be provided between the warning means and the active belt switch. The control means may comprise a door switch, which becomes ON when the door is opened and which becomes OFF when the door is closed, and front and rear limit switch, which, respectively, become ON when the sliding block arrives at the front and rear ends of the guide rail. The short circuit may be connected to the door switch in series.

DESCRIPTION OF THE PREFERRED EMBODIMENT

Figure 1:
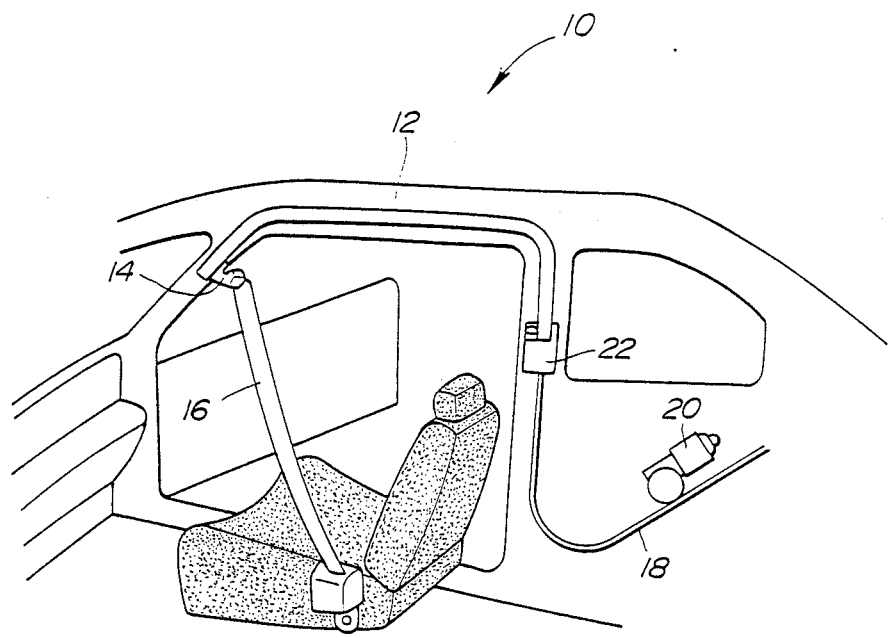
FIG. 1 is a schematic view of a seat belt system.
Figure 2:
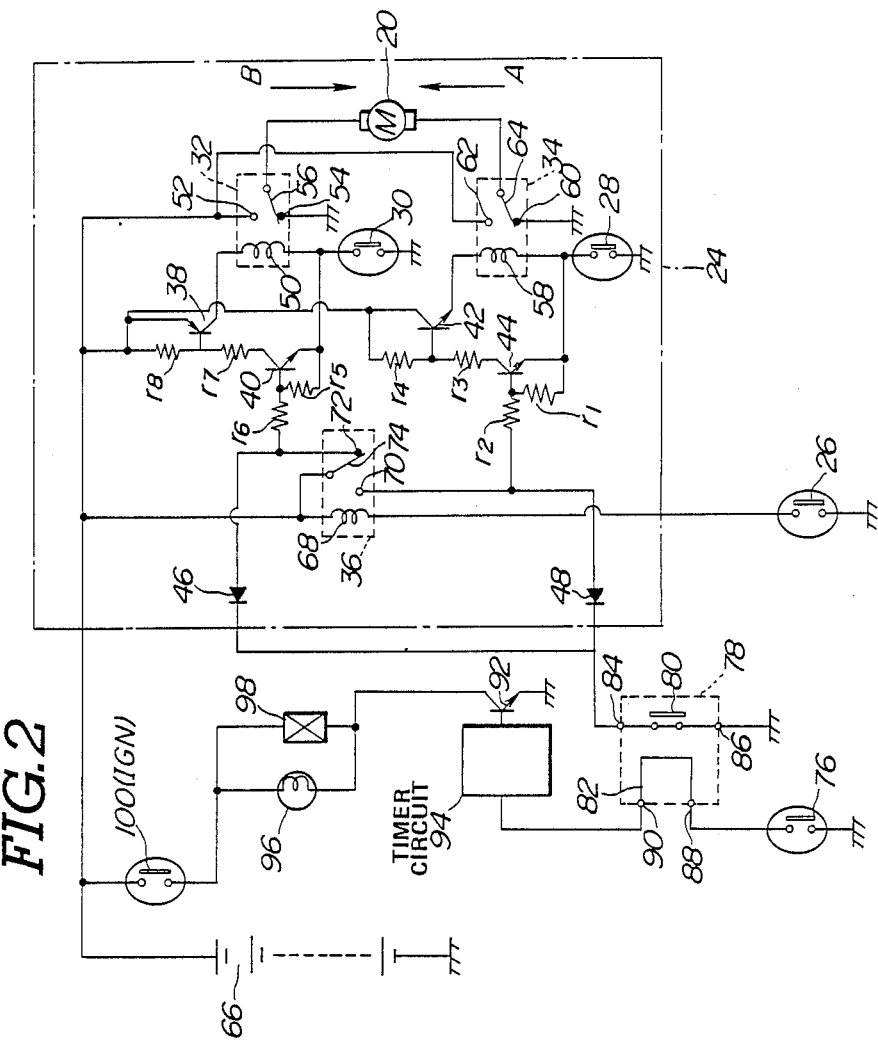
FIG. 2 is a block diagram of the first embodiment of a control circuit used in the seat belt system shown in FIG. 1, according to the present invention.

Referring now to the drawings, particularly to FIGS. 1 and 2, the first preferred embodiment of a seat belt system, according to the present invention, is described below.

As shown in FIG. 1, a guide rail 12 is provided to extend along the upper edge of a door opening of vehicle body 10. In the preferred construction, the guide rail 12 is mounted on the roof side rail of the vehicle body 10. The guide rail 12 has the front end located adjacent a front pillar and the rear end terminating adjacent a center pillar of the vehicle body 10. A sliding block 14 can slidably engage the guide rail 12. The sliding block 14 slides along the guide rail 12 between the front and rear end of the guide rail 12. The sliding block 14 carries one end of a seat belt 16. The other end of the seat belt 16 is connected to a retractor which is fixedly secured to the side of a seat near the longitudinal center of the vehicle body 10. The seat belt 16 may be wound onto the retractor in per se well known manner. The sliding block 14 is also secured to one end of an actuation wire 18, for example, a spiral actuation wire. The actuation wire 18 is movable along the guide rail 12. The other end of the actuation wire 18 is drivingly cooperated with a drive motor 20. Various driving mechanism may be taken for drivingly coupling the actuation wire 18 to the drive motor 20. In the shown embodiment, the portion of the actuation wire 18 is designed to mesh with a drive pinion or gear to be driven in axial direction of the actuation wire. Therefore, one end of the seat belt 16 can move along the guide rail 12 with the sliding block 14 when the actuation wire 18 is driven by the drive motor 20. When the vehicular door opens, the sliding block 14 is positioned at the front end of the guide rail. At this sliding block position, the seat belt is held away from the corresponding seat to allow a passage to get into and off the vehicle cabin. This sliding block and seat belt position is hereafter referred to as "release position". On the other hand, when the door is closed, the sliding block 14 is held at the rear end of the guide rail 12. At this position, the seat belt is held to be fitted on a vehicular seat occupant. This sliding block or seat belt position is hereafter referred to as "fitted position". In addition, a latch base 22 is provided at the rear end of the guide rail 12. When the sliding block 14 is moved from the position shown in FIG. 1, i.e. the release position to the fitted position, an engaging portion, which is provided at the tip of the sliding block 14, is latched on the latch base 22. The movement of the sliding block 14 is finished at this position, so that the seat belt is held at fitted position.

The revolution of the drive motor 20 is controlled by a control circuit 24 which includes front and rear limit switches 28 and 30, relays 32, 34 and 36, transistors 38, 40, 42 and 44, diodes 46 and 48 and resistors $r_1$ to $r_8$. The relay 32 comprises a relay coil 50, stationary terminals 52 and 54 and a movable contact 56 which can move between the stationary terminals by the relay coil 50. When electrical current runs through the relay coil 50, the movable contact 56 is in communication with the stationary terminal 52, and when no electrical current runs through the relay coil 50, the movable contact 56 is in communication with the stationary terminal 54 which is connected to ground. Similarly the relay 34 comprises a relay coil 58, stationary terminals 60 and 62 and a movable contact 64 which is movable between the stationary terminals 60 and 62 by the relay coil 58. When electrical current runs through the relay coil 58, the movable contact 64 is in communication with the stationary terminal 62 and, when no electrical current runs through the relay coil 58, the movable contact 64 is in communication with the stationary terminal 60 which is connected to ground. A door switch 26, which is connected to the control circuit 24, turns ON and OFF when the door is opened and closed, respectively. The front and rear limit switches 28 and 30 are arranged at the front and rear ends of the guide rail 12, and respectively become OFF when the sliding block 14 arriving the corresponding positions is detected.

One terminal of the drive motor 20 is connected to the movable contact 56 and the other terminal of the drive motor 20 is connected to the movable contact 64. The stationary terminal 52 of the relay 32 and the stationary terminal 62 of the relay 34 are connected to the positive terminal of a battery 66. In addition, the front limit switch 28 is connected to the emitter electrode of the transistor 42 via the relay coil 58 of the relay 34 and to emitter electrode of the transistor 44. The front limit switch 28 is also connected to the base electrode of the transistor 44 via the resistor $r_1$. The base electrode thereof is connected to the anode of the diode 48 via the resistor $r_2$. The collector electrode of the transistor 44 is connected to the base electrode of the transistor 42 via the resistor $r_3$. The collector electrode of the transistor 42 is connected to the stationary terminal 52 of the relay 32 and the base electrode thereof is also connected to the stationary terminal 52 via the resistor $r_4$. The rear limit switch 30 is connected to the emitter electrode of the transistor 40 and to the base electrode thereof via the resistor $r_5$. The base electrode thereof is connected to the anode of the diode 46 via the resistor $r_6$. The collector electrode of the transistor 40 is connected to the base electrode of the transistor 38 via the resistor $r_5$. The rear limit switch 30 is also connected to the emitter electrode of the transistor 38 via the relay coil 50. The collector electrode of the transistor 38 is connected to the stationary terminal 52 of the relay 32 and to the battery 66. The base electrode of the transistor 38 is also connected to the stationary terminal 52 and the battery via the resistor $r_6$. In addition, the relay 36 comprises an relay coil 68, stationary terminals 70 and 72 and a movable contact 74 which can move between the stationary terminals 70 and 72 by means of the relay coil 68. The door switch 26, which becomes, respectively, ON and OFF when the door is opened and closed, is connected to the battery 66 via the relay coil 68 of the relay 36. The stationary terminal 70 is connected to the base electrode of the transistor 44 via the resistor $r_2$ and to the anode of the diode 48. The stationary terminal 72 is connected to the base electrode of the transistor 40 via the resistor $r_6$ and to the anode of the diode 46. The movable contact 72 is connected to the battery 66.

According to the first preferred embodiment of a seat belt system of the invention, the system includes an active belt switch 76 and an prohibition circuit 78. The active belt switch 76 becomes OFF when the manually, operated seat belt, which restricts the waist of the occupant, is set and it becomes ON when the seat belt is removed. The prohibition circuit 78 becomes ON to inhibit the actuating of the control circuit 24 when the vehicle is rapidly decelerated, such as upon collision of the vehicle. The prohibition circuit 78 comprises a vehicle collision detecting switch 80, a short circuit 82 and pins 84, 86, 88 and 90 which form a 4-pin connector. The detecting switch 80 is connected to the pins 84 and 86. The short circuit 82 is connected to the pins 88 and 90 so as to be opposite to the detecting switch 80. In this prohibition circuit 78, the short circuit can not actuate when the connection between the pins 84 and 86 and the detecting switch 80 is not assured. The pin 84 is also connected to the cathode of the diode 48 and the pin 86 is also connected to ground. The pin 88 is also connected to ground via the active belt switch 76. In addition, the pin 90 is connected to the base electrode of a transistor 92, the emitter electrode of which is connected to ground, by means of a timer circuit 94 which causes the transistor 92 to be ON during a predetermined time when the active belt switch 76 is ON. The collector electrode of the transistor 92 is connected to a warning lamp 96 and a chime 98 which are disposed in parallel. When the timer circuit 94 is actuated, the warning lamp 96 emits a light and the chime 98 produces a warning noise. The warning lamp 96 and the chime 98 are also connected to the battery 66 via an ignition switch 100.

The operation of the seat belt system, according to the invention, is described below.

When the door is opened, the door switch 26 becomes ON to actuate the relay 36, so that the movable contact 74 of the relay 36 is in communication with the stationary terminal 70 thereof. As a result, electrical power is supplied to the the transistor 44. In addition,- the front limit switch 28 is ON when the sliding block 14 is not disposed at the front end of the guide rail 12. Therefore, the transistors 42 and 44 turn ON, so that electrical current runs through the relay coil 58, thereby the movable contact 64 of the relay 34 is in communication with the stationary terminal 62 thereof. As a result, electrical power is supplied to the drive motor 20 in the direction of the arrow A, so that the sliding block 14 moves forward. Thereafter, when the sliding block 14 arriving at the front end of the guide rail 12 is detected, the front limit switch 28 becomes OFF, so that power is not supplied to the drive motor 20.

On the other hand, when the door is closed, the door switch 26 becomes OFF, so that the relay 36 becomes OFF, i.e. the movable contact 74 is in communication with the stationary terminal 72. In this case, power is supplied to the base electrode of the transistor 40 through the relay 36. In addition, the rear limit switch 30 is ON when the sliding block 14 is not disposed at the rear end of the guide rail 12. Therefore, the transistors 38 and 40 turns ON, so that the relay 32 becomes ON, i.e. the movable contact 56 is in communication with the stationary terminal 52. As a result, power is supplied to the drive motor 20 through the relay 32 in the direction of the arrow B, so that the sliding block 14 moves rearwardly. Thereafter, when the sliding block 14 arriving at the rear end of the guide rail 12 is detected, the rear limit switch 30 becomes OFF. As a result, power is not supplied to the drive motor 20, so that the movement of the sliding block 14 is stopped.

When the vehicle is rapidly decelerated, such a upon collision of the vehicle, the detecting switch 80 turns ON. In this case, the electrical potentials of the bases of the transistors 40 and 44 are same as ground. Therefore, in cases where the door switch 26 turns ON because the door is broken in a car crash or the like, power is not supplied to the drive motor 20. As a result, the sliding block 14 is not moved, so that it is possible to restrain the occupant from thrown out of the vehicle.

According to the first preferred embodiment of a seat belt system of the invention, when the active belt disposed about the waist of the occupant is removed, the active belt switch 76 turns ON to actuate the timer circuit 94. When the timer circuit 94 is actuated, power is supplied to the base electrode of the transistor 92, so that the transistor 92 turns ON, thereby the warning lamp 96 and the chime 98 is actuated for a predetermined time. In this case, the short circuit 82 is not actuated when the connections between the connectors 84 and 86 and the detecting switch 80 and/or between the connectors 88 and 90 and the short circuit 82 are abnormal. When the short circuit 82 is not actuated, the warning lamp 96 and the chime 98 are not actuated even if the manually operated belt is removed. Therefore, it is possible to confirm the non-connection state in the prohibition circuit 78.

Figure 3:
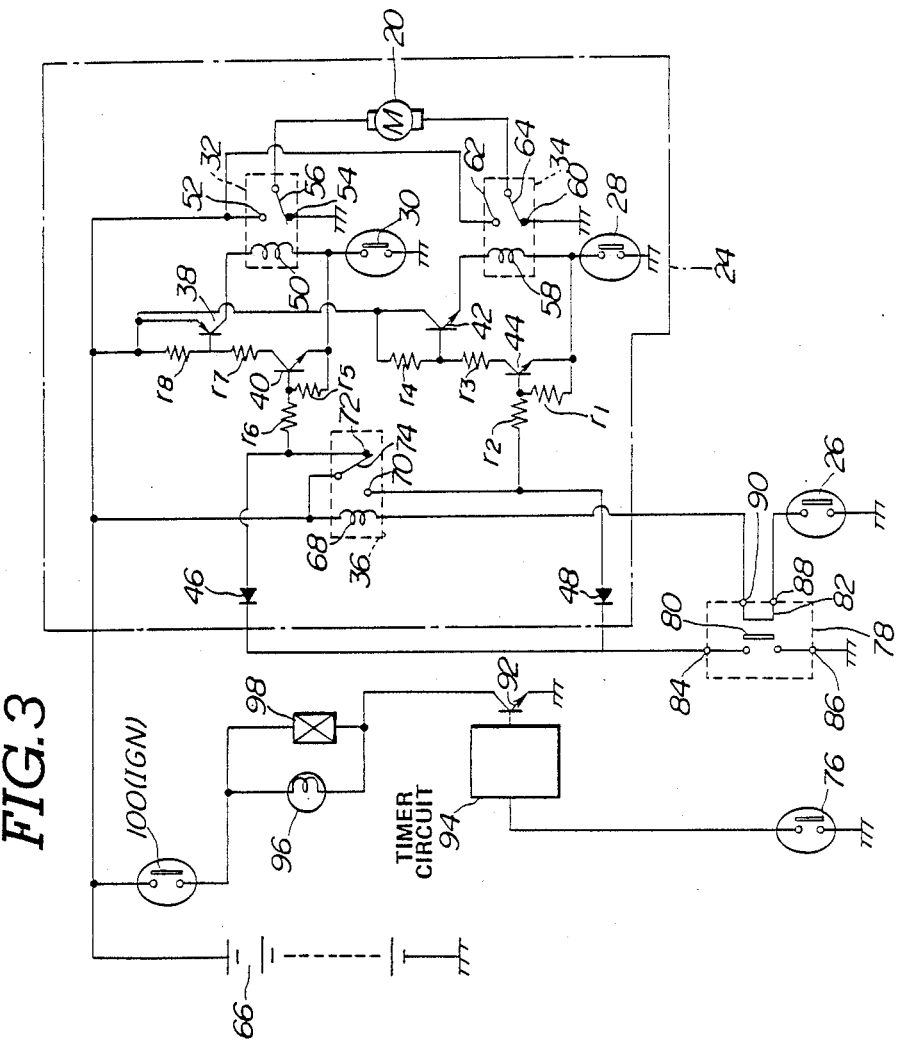
FIG. 3 is a block diagram of the second preferred embodiment of a control circuit in the seat belt system shown in FIG. 1, according to the present invention.

FIG. 3 shows the second preferred embodiment of a seat belt system, according to the present invention. As shown in FIG. 3, the short circuit 82 is provided between the door switch 26 and the relay coil 68 of the relay 36. In this case, since the short circuit 82 is not actuated when the connections between the connectors 84 and 86 and the detecting switch 80 and/or between the connectors 88 and 90 and the short circuit are abnormal, the control circuit 24 is not actuated when the door is opened and closed, so that the sliding block 14 does not move. Therefore, it is possible to judge whether or not the connection between the connectors in the prohibition circuit 80 exists.

What is claimed is:

1. A seat belt system for a vehicle comprising:
    a seat belt for restricting the occupant;
    drive means for causing said seat belts to move between fitted position, in which the occupant is restricted by means of said seat belt, and a release position, in which the occupant is released from said seat belt;
    control means for controlling the movement of said seat belt;

prohibition means for preventing said seat belt from moving from said fitted position to said release position for a predetermined time when the vehicle is rapidly decelerated; and confirmation means or confirming the connection in said prohibition means and for checking emergency seat belt locking condition.

2. A seat belt system for a vehicle comprising:

a seat belt for restricting the occupant;

drive means for causing said seat belt to move between a fitted position in which the occupant is restricted by means of said seat belt, and a release position in which the occupant is release from said seat belt;

control means for controlling the movement of said seat belt;

prohibition means for preventing said seat belt from moving from said fitted position to said release position for a predetermined time during rapid vehicle deceleration, said prohibition means including a detecting switch which turns ON to restrict the movement of said seat belt when the vehicle is rapidly decelerated; and confirmation means for confirming the connection in said prohibition means.

3. A seat belt system as set forth in claim 2, wherein said confirmation means comprises a 4-pin connector and a short circuit provided between two pins of said connector and wherein said detecting switch is provided between the other two pins of said connector so as to be opposite to said short circuit, said short circuit being connected to a warning means and an active belt switch, which turns OFF when the manually operated seat belt restricting the waist of the occupant is set and which turns ON when the seat belt is removed, in series.

4. A seat belt system as set forth in claim 3, wherein said warning means comprises a warning lamp.

5. A seat belt system as set forth in claim 3, wherein said warning means comprises a chime producing a warning noise.

6. A seat belt system as seat forth in claim 2, wherein a timer circuit, which supplies power to said warning means for a predetermined time when said active belt switch turns ON, is provided between said warning means and said active belt switch.

7. A seat belt system as set forth in claim 2, wherein said seat belt is provided with a sliding block at one end thereof, said sliding block being slidable along a guide rail which extends longitudinally along the verge of the roof of said vehicle, and wherein said sliding block is positioned at the rear end of said guide rail when said seat belt is positioned at said fitted position and said sliding block is positioned at the front end of said guide rail when said seat belt is positioned at said release position.

8. A seat belt system as set forth in claim 7, wherein said drive means causes said sliding block to move between the front and rear ends of said guide rail.

9. A seat belt system as seat forth in claim 8, wherein said control means includes a door switch, which turns ON when the door is opened and which turns OFF when the door is closed, and front and rear limit switches, said front limit switch turning ON when said sliding block arriving at the front end of said guide rail is detected and said rear limit switch turning ON when said sliding block arriving at the rear end of said guide rail is detected.

10. A seat belt system as seat forth in claim 9, wherein said confirmation means comprises a 4-pin connector and a short circuit provided between two pins of said connector and wherein said detecting switch is provided between the other two pins of said connector so as to be opposite to said short circuit, said short circuit being connected to said door switch in series.

11. A seat belt system as set forth in claim 8, wherein said drive means comprises a drive motor and a actuation wire which is provided within said guide rail, one end of said actuation wire being fixed to said sliding block and the other end of said actuation wire meshing with a drive pinion driven by said drive motor.

12. A seat belt system as set forth in claim 8, wherein said drive means comprises a drive motor and a actuation wire which is provided within said guide rail, one end of said actuation wire being fixed to said sliding block and the other end of said actuation wire meshing with a gear driven by said drive motor.

13. A seat belt system as set forth in claim 7, wherein said sliding block is latched on a latch base at the rear end of said guide rail.

14. A seat belt system as seat forth in claim 2, wherein said detecting switch is a sensor.

* * * * *